US008561760B2

(12) United States Patent
Yoshikawa et al.

(10) Patent No.: US 8,561,760 B2
(45) Date of Patent: Oct. 22, 2013

(54) HYDRAULIC SYSTEM FOR WORKING VEHICLE

(75) Inventors: Takeshi Yoshikawa, Hakusan (JP); Hitoshi Miyamoto, Komatsu (JP)

(73) Assignee: Komatsu Ltd., Tokyo (JP)

( * ) Notice: Subject to any disclaimer, the term of this patent is extended or adjusted under 35 U.S.C. 154(b) by 235 days.

(21) Appl. No.: 13/143,572

(22) PCT Filed: Dec. 25, 2009

(86) PCT No.: PCT/JP2009/071575
§ 371 (c)(1),
(2), (4) Date: Jul. 7, 2011

(87) PCT Pub. No.: WO2010/087096
PCT Pub. Date: Aug. 5, 2010

(65) Prior Publication Data
US 2011/0272239 A1  Nov. 10, 2011

(30) Foreign Application Priority Data
Jan. 29, 2009 (JP) .................. 2009-017879

(51) Int. Cl.
*F01M 1/00* (2006.01)
*F16N 25/00* (2006.01)

(52) U.S. Cl.
USPC .............................................. 184/6; 184/7.3

(58) Field of Classification Search
USPC .................... 184/6, 6.12, 6.28, 7.3
See application file for complete search history.

(56) References Cited

U.S. PATENT DOCUMENTS

| 4,321,793 | A | * | 3/1982 | Uranaka et al. ................. 60/358 |
| 4,517,800 | A | * | 5/1985 | Karakama et al. ............. 60/337 |
| 5,590,737 | A | * | 1/1997 | Azuma et al. ................. 180/308 |
| 5,615,553 | A | * | 4/1997 | Lourigan ........................ 60/422 |
| 6,425,232 | B1 | * | 7/2002 | Desnijder et al. .......... 56/16.4 B |
| 6,786,317 | B2 | * | 9/2004 | Matsufuji et al. ........ 192/48.611 |
| 2002/0043057 | A1 | * | 4/2002 | Shiba et al. ......................... 56/1 |
| 2007/0209982 | A1 | * | 9/2007 | Nystrom et al. .............. 210/132 |
| 2007/0209983 | A1 | * | 9/2007 | Johnson et al. .............. 210/132 |
| 2008/0185211 | A1 | * | 8/2008 | Akashima et al. ............. 180/367 |
| 2008/0251336 | A1 | * | 10/2008 | Ohtsuki et al. ................ 188/361 |
| 2010/0206253 | A1 | * | 8/2010 | Fujimoto et al. ........... 123/90.15 |

FOREIGN PATENT DOCUMENTS

| JP | 62-166364 | U | 10/1987 |
| JP | 2001-280451 | A | 10/2001 |
| JP | 2002-137757 | A | 5/2002 |
| JP | 2004-132467 | A | 4/2004 |
| JP | 2004-211665 | A | 7/2004 |
| JP | 2005-226722 | A | 8/2005 |
| JP | 2005-265014 | A | 9/2005 |

OTHER PUBLICATIONS

International Search Report of corresponding PCT Application No. PCT/JP2009/071575.

\* cited by examiner

*Primary Examiner* — William E Dondero
*Assistant Examiner* — Minh Truong
(74) *Attorney, Agent, or Firm* — Global IP Counselors, LLP

(57) ABSTRACT

A low-pressure pump supplies oil stored in a steering case to a steering device as lubricating oil via a steering lubricating circuit. A high-pressure pump supplies the oil stored in the steering case to a clutch via a high-pressure circuit. A transmission lubricating circuit branches off from the high-pressure circuit via a relief valve and supplies lubricating oil to a transmission device. A transmission-lubricating assist circuit is provided so as to branch off from the steering lubricating circuit and is connected to the transmission lubricating circuit. A transmission case stores the oil used to lubricate the transmission device. A scavenging pump returns the oil stored in the transmission case to the steering device.

6 Claims, 5 Drawing Sheets

HYDRAULIC SYSTEM FOR WORKING VEHICLE

CROSS-REFERENCE TO RELATED APPLICATIONS

This national phase application claims priority to Japanese Patent Application No. 2009-017879 filed on Jan. 29, 2009. The entire disclosure of Japanese Patent Application No. 2009-017879 is hereby incorporated herein by reference.

TECHNICAL FIELD

The present invention relates to a hydraulic system for a working vehicle, and particularly to a hydraulic system for supplying lubricating oil to a transmission device and a steering device.

BACKGROUND ART

In a working vehicle such as a bulldozer, lubricating oil is supplied to the transmission device and the steering device. The lubricating oil supplied to the transmission device and the steering device is recovered in a transmission case for housing the transmission device and a steering case for housing the steering device, respectively, and is reused (see Japanese Laid-Open Patent Publication No. 2004-211665).

The structure of a conventional hydraulic system for supplying lubricating oil to the transmission device and the steering device is shown in FIG. 5. In the conventional hydraulic system, oil stored in the steering case 81 is supplied to a steering lubricating circuit 83 by means of a low-pressure pump 82. The oil is then supplied as the lubricating oil to the steering device 84 via the steering lubricating circuit 83. The oil used as the lubricating oil drips down from the steering device 84, and is recovered in the steering case 81.

The oil stored in the steering case 81 is supplied to a high-pressure circuit 86 by means of a high-pressure pump 85. The oil is then supplied to the clutch 87 of the transmission device via the high-pressure circuit 86, whereby the clutch 87 is driven. A low-pressure circuit 89 is connected to the high-pressure circuit 86 via a relief valve 88. The oil stored in the steering case 81 is also supplied to the low-pressure circuit 89 by means of the high-pressure pump 85. The oil supplied to the low-pressure circuit 89 passes through a torque converter 90, and is then supplied as lubricating oil to a transmission device 91. The oil used as the lubricating oil drips down from the transmission device 91, and is recovered in a transmission case 92.

The oil stored in the transmission case 92 is returned to the steering case 81 by means of a scavenging pump 93 via a scavenging circuit 94, the steering lubricating circuit 83, and the steering device 84.

SUMMARY

The efficiency of the high-pressure pump tends to be lower than the efficiency of the low-pressure pump. Furthermore, the high-pressure pump has greater individual variance in efficiency compared with the low-pressure pump. For this reason, such a hydraulic system has a possibility that the amount of lubricating oil in the transmission device may become insufficient in case the variance in efficiency of the high-pressure pump exceeds an allowable value. On one hand, the insufficient amount of lubricating oil in the transmission device is preventable by using a high-pressure pump having surplus capacity. In this case, however, the high-pressure pump is enlarged, which causes an increase in cost. Furthermore, enlargement of the high-pressure pump requires the scavenging pump to be enlarged, because the amount of oil flowing into the transmission case increases. In this case, the production cost further increases.

An object of the present invention is to provide a hydraulic system for a working vehicle in which poor lubrication at the transmission device is preventable at a low cost.

The hydraulic system for a working vehicle according to a first aspect includes a steering device, a steering lubricating circuit, a steering case, a low-pressure pump, a transmission device, a high-pressure circuit, a high-pressure pump, a transmission lubricating circuit, a transmission-lubricating assist circuit, a transmission case, and a scavenging pump. The steering lubricating circuit is a circuit for supplying oil for lubrication to the steering device. The steering case houses the steering device and stores the oil used to lubricate the steering device. The low-pressure pump supplies oil stored in the steering case to the steering lubricating circuit. The transmission device includes a clutch. The high-pressure circuit is a circuit for supplying the oil for driving to the clutch. The high-pressure pump supplies the oil stored in the steering case to the high-pressure circuit. The transmission lubricating circuit is a circuit that branches off from the high-pressure circuit via a relief valve and supplies the oil for lubrication to the transmission device. The transmission-lubricating assist circuit is a circuit provided so as to branch off from the steering lubricating circuit and connected to the transmission lubricating circuit. The transmission case houses the transmission device and stores the oil used to lubricate the transmission device. The scavenging pump returns the oil stored in the transmission case to the steering device.

In this hydraulic system, oil that is discharged from the low-pressure pump is supplied to the transmission lubricating circuit via the transmission-lubricating assist circuit. The oil is then combined with the oil discharged from the high-pressure pump, and is supplied as the lubricating oil to the transmission device. The low-pressure pump has less variance in efficiency in comparison with the high-pressure pump. Poor lubrication of the transmission device caused by variance in efficiency of the high-pressure pump is therefore preventable. Furthermore, because the high-pressure pump does not need to be enlarged, increase in production cost is preventable. Additionally, a portion of the oil discharged from the low-pressure pump is sent to the transmission lubricating circuit via the transmission-lubricating assist circuit, and is eventually returned to the steering device by the scavenging pump. Reduction in the amount of lubricating oil in the steering device is therefore also preventable.

The hydraulic system for a working vehicle according to a second aspect is the hydraulic system according to the first aspect, further including a flow rate adjuster. The flow rate adjuster reduces the flow rate of the oil sent from the steering lubricating circuit to the transmission-lubricating assist circuit when the flow rate of the oil in the transmission lubricating circuit increases. The flow rate adjuster increases the flow rate of the oil sent from the steering lubricating circuit to the transmission-lubricating assist circuit when the flow rate of the oil in the transmission lubricating circuit decreases.

In this hydraulic system, the amount of oil being sent to the transmission-lubricating assist circuit is adjusted according to the increase or decrease in the amount of oil in the transmission lubricating circuit. An excessive or deficient supply of lubricating oil to the transmission device is therefore preventable. Furthermore, because the excessive supply of lubricating oil to the transmission device is preventable, the scavenging pump does not need to be enlarged. An increase in cost is therefore preventable.

According to the present invention, poor lubrication at the transmission device is preventable at a low cost.

DESCRIPTION OF EMBODIMENTS

Structure of Bulldozer

Figure 1:
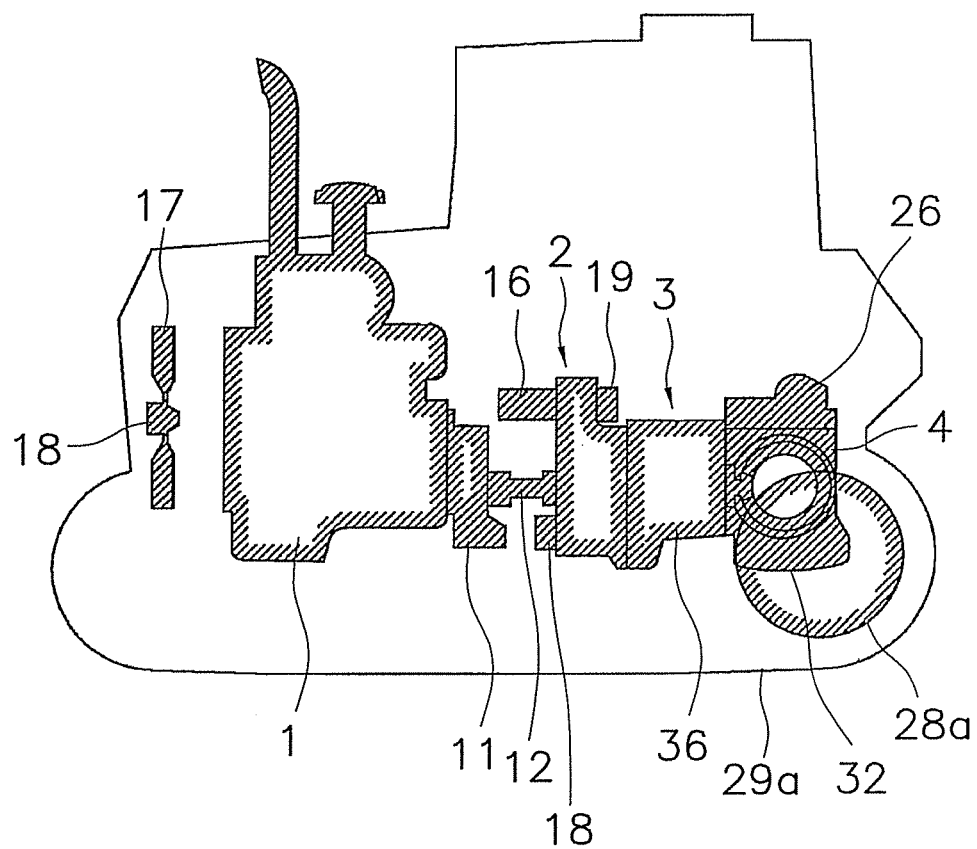
FIG. 1 is a view showing a schematic structure of a bulldozer according to an embodiment of the present invention.
Figure 2:
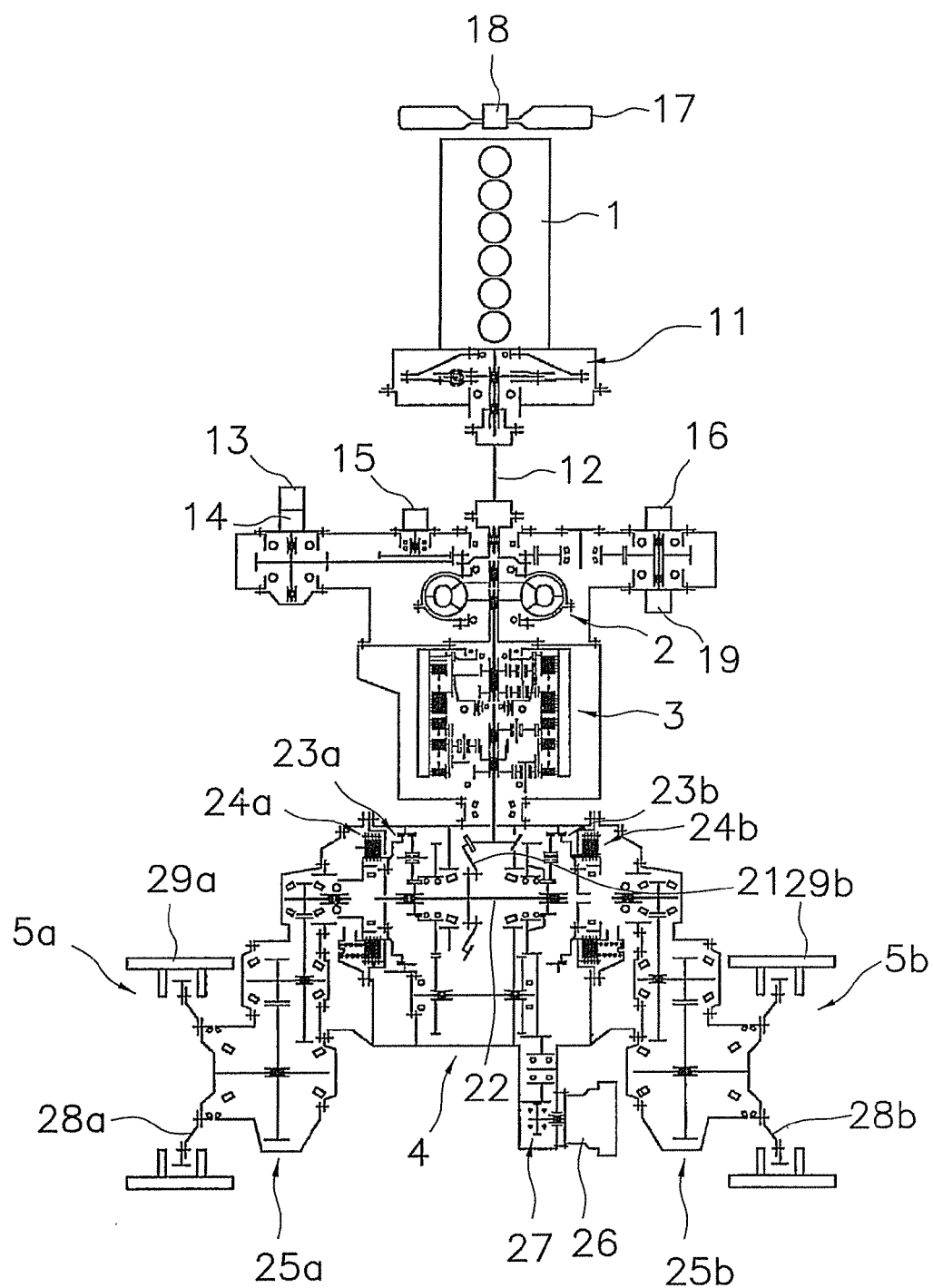
FIG. 2 is a view showing the structure of the drive train of a bulldozer.

The structure of a bulldozer provided with the hydraulic system according to an embodiment of the present invention is shown in FIGS. 1 and 2. This bulldozer comprises an engine 1, a torque converter 2, a transmission device 3, a steering device 4, and a pair of travel devices 5a, 5b (see FIG. 2).

The engine 1 is a diesel engine, and the output of the engine 1 is controlled by adjusting the amount of fuel injected from a fuel injection pump (not shown). The power generated by the engine 1 is transmitted to the torque converter 2 via a damper 11 and a universal joint 12. Furthermore, the engine drives a low-pressure pump 13, a high-pressure pump 14, a scavenging pump 15, a steering pump 16, a cooling fan pump 19, which are described below, and other hydraulic pumps. Additionally, a cooling fan 17 and a cooling fan motor 18 are provided in front of the engine 1. The cooling fan motor 18 is driven by oil from the cooling fan pump 19.

The torque converter 2 transmits power from the engine 1 to the transmission device 3 through the medium of oil.

The transmission device 3 includes a plurality of gear trains and a plurality of hydraulic clutches. The transmission device 3 switches between forward and backward movement and shifts gears by switching the engagement and release of each of the clutches. The power outputted from the transmission device 3 is transmitted to the steering device 4.

The steering device 4 includes a bevel gear 21, a horizontal shaft 22, a pair of planetary gear mechanisms 23a, 23b, a pair of braking devices 24a, 24b, a pair of final reduction gears 25a, 25b, a steering motor 26, and a steering power transmission mechanism 27. The power outputted from the transmission device 3 is transmitted to the horizontal shaft 22 via the bevel gear 21. The power transferred to the horizontal shaft 22 is transmitted to the braking devices 24a, 24b via the planetary gear mechanisms 23a, 23b. The braking devices 24a, 24b are so-called negative brakes, which have a wet multiplate clutch, and release the braking action by the application of hydraulic pressure. The power outputted from the braking devices 24a, 24b is transmitted to the final reduction gears 25a, 25b.

The steering motor 26 is rotationally driven by the oil discharged from the steering pump 16. The power generated in the steering motor 26 is transmitted to the left and right planetary gear mechanisms 23a, 23b via the steering power transmission mechanism 27. The left and right planetary gear mechanisms 23a, 23b create a difference in rotational frequency to control the turning direction of the vehicle body.

The pair of travel devices 5a, 5b each includes sprockets 28a, 28b, and crawler tracks 29a, 29b wrapped around the sprockets 28a, 28b. Power outputted from the final reduction gears 25a, 25b of the steering device 4 is transmitted to the sprockets 28a, 28b and causes the sprockets 28a, 28b to rotate. The crawler tracks 29a, 29b are driven thereby, and the bulldozer is made to travel.

Structure of Hydraulic System

Figure 3:
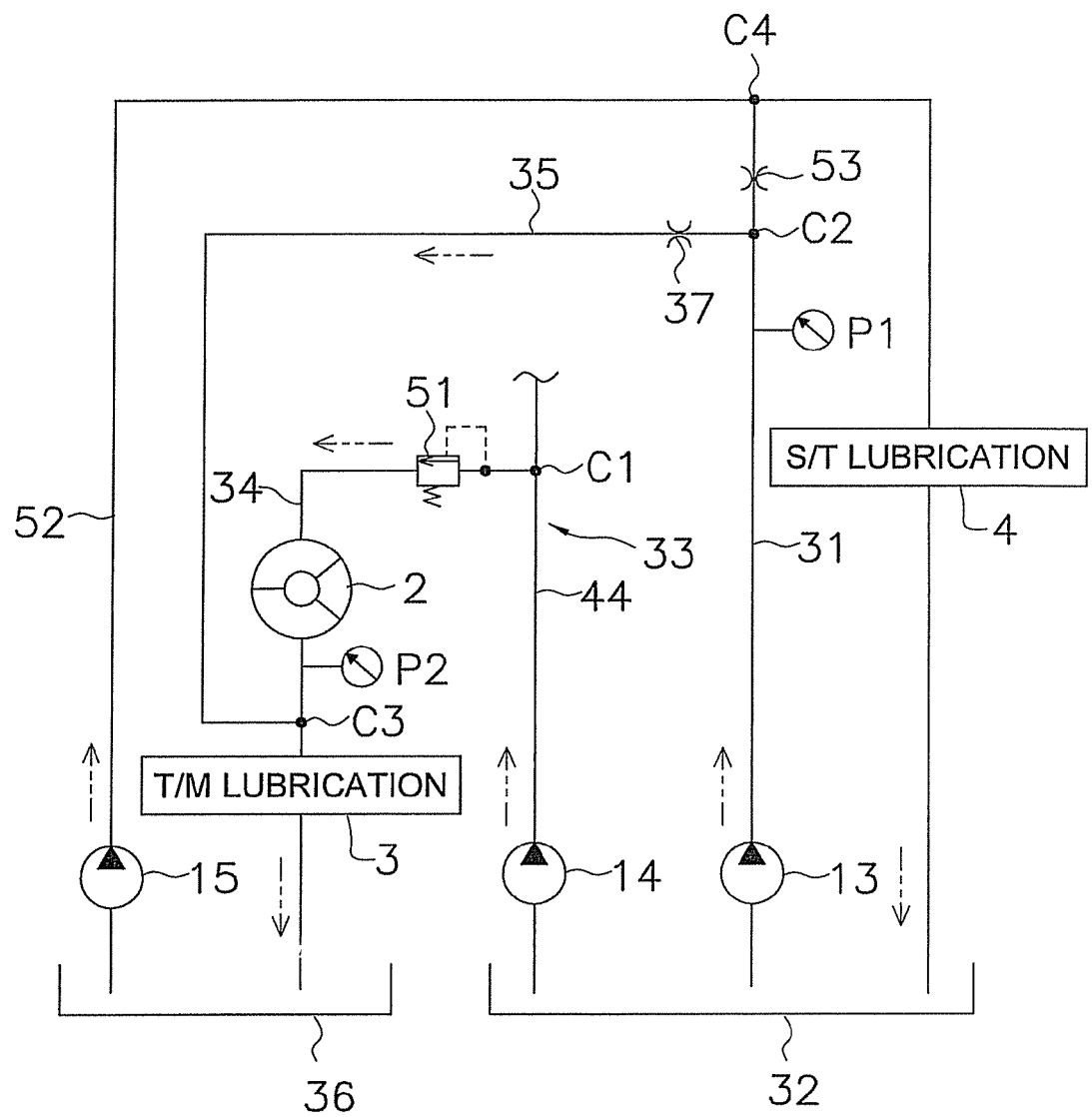
FIG. 3 is a view showing the structure of a hydraulic system provided to a bulldozer.

The structure of the hydraulic system provided to the above-described bulldozer is shown in FIG. 3. The hydraulic system is used to supply lubricating oil to the steering device 4 and the transmission device 3, which are described above, and includes a steering lubricating circuit 31, a steering case 32, a low-pressure pump 13, a high-pressure circuit 33, a high-pressure pump 14, a transmission lubricating circuit 34, a transmission-lubricating assist circuit 35, a transmission case 36, a scavenging pump 15, a scavenging circuit 52, and a flow rate adjuster 37.

The steering lubricating circuit 31 is connected to the low-pressure pump 13 and the steering device 4, and is a circuit for supplying oil for lubrication to the steering device 4.

The steering case 32 houses the steering device 4. The bottom portion of the steering case 32 forms an oil pan for receiving oil that drips down from the steering device 4, and the steering case 32 stores oil used to lubricate the steering device 4.

The low-pressure pump 13 is connected to the steering lubricating circuit 31. The low-pressure pump 13 supplies the oil stored in the steering case 32 to the steering lubricating circuit 31.

Figure 4:
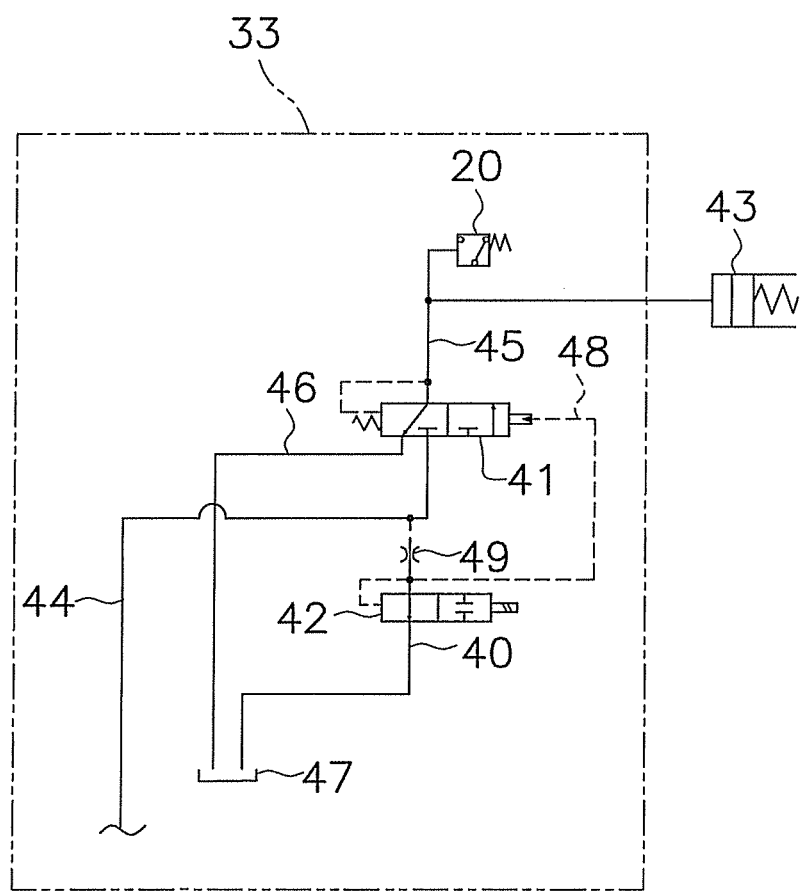
FIG. 4 is a view showing the structure of a high-pressure circuit.
Figure 5:
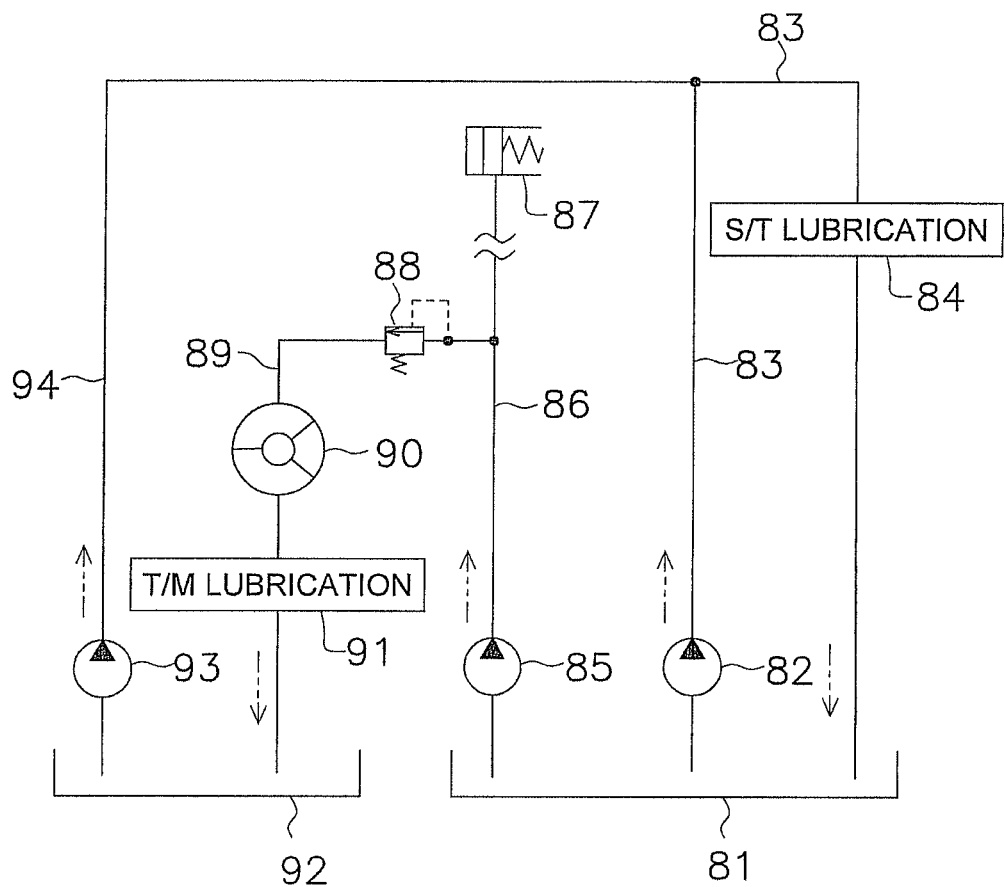
FIG. 5 is a view showing the structure of a conventional hydraulic system.

The high-pressure circuit 33 is a circuit for supplying oil for driving to the clutch of the transmission device 3, through which oil having a pressure higher than that of the steering lubricating circuit 31 and the transmission lubricating circuit 34 flows. Through the high-pressure circuit 33, oil discharged from the high-pressure pump 14 is able to be controlled to the desired pressure and supplied to the clutch. Also through the high-pressure circuit 33, oil from the clutch is able to be recovered and discharged into a tank. The structure of the high-pressure circuit 33 is shown in FIG. 4. The high-pressure circuit 33 includes a pressure control valve 41 and an electromagnetic control valve 42.

The pressure control valve 41 is a device for controlling the pressure of the oil supplied to the clutch 43 of the transmission device 3. The pressure control valve 41 is connected to an input channel 44, an output channel 45, and a drain channel 46. The input channel 44 is connected to the high-pressure pump 14. The output channel 45 is connected to the clutch 43. The drain channel 46 is connected to the tank 47. Furthermore, a pilot channel 48 is connected to the pilot port of the pressure control valve 41. The pressure control valve 41 adjusts, according to the magnitude of the pilot pressure of the pilot channel 48, the oil pressure of the input channel 44 and feeds the oil to the output channel 45. In other words, the pressure control valve 41 changes the clutch pressure according to the input pilot pressure. Additionally, the pressure control valve 41 connects the output channel 45 and the drain channel 46 in a state where no pilot pressure is supplied to the pressure control valve 41. Oil is thereby discharged from the clutch 43 and is recovered in the tank 47.

The electromagnetic control valve 42 is a device for controlling the pilot pressure inputted to the pressure control valve 41. The electromagnetic control valve 42 is connected to the input channel 44 via a restrictor 49. The above-described pilot channel 48 is connected between the electromagnetic control valve 42 and the restrictor 49. Furthermore, the electromagnetic control valve 42 is connected to the tank 47 via the drain channel 40. The electromagnetic control valve 42 is switchable between a connected state in which the input channel 44 and the drain channel 40 are connected, and a blocked state in which the input channel 44 and the drain channel 40 are blocked. The electromagnetic control valve 42 is switchable between the connected state and the blocked state according to the magnitude of the command current inputted by a controller (not shown). The electromagnetic control valve 42 can thereby control the pilot pressure supplied to the pilot channel 48 according to the command current.

Furthermore, a pressure switch 20 is provided to the high-pressure circuit 33. The pressure switch 20 outputs a sensing signal to the controller when the clutch pressure reaches a predetermined set pressure.

In this hydraulic system, furthermore, multiple high-pressure circuits 33 are provided in parallel to correspond to the clutches of the forward, backward, and multiple speed steps of the transmission device 3, but only one high-pressure circuit 33 is shown in FIG. 4.

The high-pressure pump 14 shown in FIG. 3 is connected to the input channel 44 of the high-pressure circuit 33. The high-pressure pump 14 supplies the oil stored in the steering case 32 to the high-pressure circuit 33. The high-pressure pump 14 has the same discharge capacity as the low-pressure pump 13.

The transmission lubricating circuit 34 is connected to the input channel 44 of the high-pressure circuit 33 at connection point C1, and branches off from the high-pressure circuit 33 via a relief valve 51. The transmission lubricating circuit 34 is a circuit for supplying oil for lubrication to the transmission device 3. Furthermore, the transmission lubricating circuit 34 passes through the above-described torque converter 2 and supplies power-transmitting oil to the torque converter 2. The relief valve 51 creates a block between the high-pressure circuit 33 and the transmission lubricating circuit 34 when the oil pressure of the high-pressure circuit 33 is at or below a predetermined relief pressure. Furthermore, the relief valve 51 creates an opening between the high-pressure circuit 33 and the transmission lubricating circuit 34 when the oil pressure of the high-pressure circuit 33 is above the relief pressure, and causes a portion of the oil in the high-pressure circuit 33 to flow to the transmission lubricating circuit 34. The relief valve 51 therefore fulfills a function of supplying oil to the transmission lubricating circuit 34 as well as compensating the oil pressure of the high-pressure circuit 33 to a predetermined high pressure. Oil having a relatively high pressure is thereby supplied to the high-pressure circuit 33, and oil having a relatively low pressure is supplied to the transmission lubricating circuit 34.

The transmission-lubricating assist circuit 35 is connected to the steering lubricating circuit 31 at connection point C2, and branches off from the steering lubricating circuit 31. Furthermore, the transmission-lubricating assist circuit 35 is connected to the transmission lubricating circuit 34 at connection point C3. The connection point C3 is positioned downstream from the torque converter 2 and upstream from the transmission device 3.

The transmission case 36 houses the transmission device 3. The bottom portion of the transmission case 36 forms an oil pan for receiving oil that drips down from the transmission device 3, and the transmission case 36 stores oil used to lubricate the transmission device 3.

The scavenging pump 15 is connected to the scavenging circuit 52. The scavenging circuit 52 is connected to the steering lubricating circuit 31 at connection point C4, and the scavenging pump 15 returns the oil stored in the transmission case 36 to the steering device 4 via the scavenging circuit 52 and the steering lubricating circuit 31. Furthermore, the connection point C4 is positioned downstream from the connection point C2 in the steering lubricating circuit 31.

The flow rate adjuster 37 is a restrictor provided downstream from the connection point C2 in the transmission-lubricating assist circuit 35. The flow rate adjuster 37 reduces the flow rate of the oil sent from the steering lubricating circuit 31 to the transmission-lubricating assist circuit 35 when the flow rate of the oil in the transmission lubricating circuit 34 increases to increase the oil pressure P2 thereof. Furthermore, the flow rate adjuster 37 increases the flow rate of oil sent from the steering lubricating circuit 31 to the transmission-lubricating assist circuit 35 when the flow rate of the oil in the transmission lubricating circuit 34 reduces to decrease the oil pressure P2 thereof.

A restrictor 53 is provided at a position downstream from the connection point C2 and upstream from the connection point C4 in the steering lubricating circuit 31. The oil pressure P1 of the steering lubricating circuit 31 is kept higher than the oil pressure P2 of the transmission lubricating circuit 34 by this restrictor 53. Backward flow of oil in the transmission-lubricating assist circuit 35 is thereby prevented.

Function of Hydraulic System

The flow of oil in the above-described hydraulic system is described below.

The oil discharged from the high-pressure pump 14 is supplied to the clutch 43 of the transmission device 3 via the high-pressure circuit 33. Furthermore, a portion of the oil discharged from the high-pressure pump 14 is sent to the transmission lubricating circuit 34.

The oil discharged from the low-pressure pump 13 is supplied as lubricating oil to the steering device 4 via the steering lubricating circuit 31. The oil supplied to the steering device 4 is recovered by the steering case 32 after passing through the steering device 4. A portion of the oil discharged from the low-pressure pump 13 is supplied to the transmission lubricating circuit 34 via the transmission-lubricating assist circuit 35. Oil from the transmission-lubricating assist circuit 35 and the oil sent from the high-pressure circuit 33 to the transmission lubricating circuit 34 are combined and supplied as lubricating oil to the transmission device 3.

In the case where the high-pressure pump 14 has a high efficiency to increase the flow rate of oil in the transmission lubricating circuit 34, the amount of assist oil from the transmission-lubricating assist circuit 35 is kept relatively small by the action of the flow rate adjuster 37. Furthermore, in the case where the high-pressure pump 14 has a low efficiency to reduce the flow rate of oil in the transmission lubricating circuit 34, the amount of assist oil from the transmission-lubricating assist circuit 35 is kept relatively large by the action of the flow rate adjuster 37.

The oil supplied to the transmission device 3 is recovered by the transmission case 36 after passing through the transmission device 3.

The oil stored in the transmission case 36 is sent to the scavenging circuit 52 by the scavenging pump 15, and is returned to the steering case 32 via the steering lubricating circuit 31 and the steering device 4.

In this hydraulic system, the oil supplied for lubricating the transmission device 3 is compensated by the oil discharged from the low-pressure pump 13 and supplied via the transmission-lubricating assist circuit 35. The low-pressure pump 13 has less variance in efficiency in comparison with the high-pressure pump 14. Poor lubrication of the transmission device 3 caused by the variance in efficiency of the high-pressure pump 14 is therefore preventable.

Furthermore, the high-pressure pump 14 does not need to be enlarged in order to prevent the insufficient lubrication of the transmission device 3. Because an optimal amount of oil is consistently supplied to the transmission device 3, the scavenging pump 15 does not need to be enlarged either. An increase in manufacturing cost is therefore preventable.

Furthermore, a portion of the oil discharged from the low-pressure pump 13 is sent to the transmission lubricating circuit 34 via the transmission-lubricating assist circuit 35, but is eventually returned to the steering lubricating circuit 31 by the scavenging pump 15. Reduction in the amount of lubricating oil in the steering device 4 is therefore preventable.

OTHER EMBODIMENTS

An embodiment of the present invention was described above, but the present invention is not limited by the above-described embodiment and can be modified in a variety of ways without departing from the scope of the invention.

(a) The hydraulic system according to the present invention can be provided to a working vehicle other than a bulldozer.

(b) The above-described embodiment is illustrated with reference to a restrictor as the flow rate adjuster, but a flow control valve may also be used. The use of a restrictor is preferred from the perspective of reducing production cost.

The above-described embodiments have the effect of being able to prevent poor lubrication in a transmission device at low cost, and are useful as a hydraulic system for a working vehicle.

The invention claimed is:

1. A hydraulic system for a working vehicle comprising:
   a steering device;
   a steering lubricating circuit configured and arranged to supply oil for lubrication to the steering device;
   a steering case housing the steering device, and configured and arranged to store the oil used to lubricate the steering device;
   a low-pressure pump configured and arranged to supply the oil stored in the steering case to the steering lubricating circuit;
   a transmission device having a clutch;
   a high-pressure circuit configured and arranged to supply the oil for driving to the clutch;
   a high-pressure pump configured and arranged to supply the oil stored in the steering case to the high-pressure circuit;
   a transmission lubricating circuit configured and arranged to supply the oil for lubrication to the transmission device, the transmission lubricating circuit branching off from the high-pressure circuit via a relief valve;
   a transmission-lubricating assist circuit connected to the transmission lubricating circuit, the transmission-lubricating assist circuit branching off from the steering lubricating circuit;
   a transmission case housing the transmission device, and configured and arranged to store the oil used to lubricate the transmission device;
   a scavenging pump configured and arranged to return the oil stored in the transmission case to the steering device; and a torque converter being provided in the transmission lubricating circuit between the relief valve and the transmission device, the transmission-lubricating assist circuit being connected to the transmission lubricating circuit at a connection point between the torque converter and the transmission device.

2. The hydraulic system for a working vehicle according to claim 1, further comprising
   a flow rate adjuster configured and arranged to reduce a flow rate of the oil sent from the steering lubricating circuit to the transmission-lubricating assist circuit when the flow rate of the oil in the transmission lubricating circuit increases, the flow rate adjuster being further configured to increase the flow rate of the oil sent from the steering lubricating circuit to the transmission-lubricating assist circuit when the flow rate of the oil in the transmission lubricating circuit decreases.

3. The hydraulic system for a working vehicle according to claim 1, wherein
   the transmission-lubricating assist circuit branches from the steering lubricating circuit at a first connection point between the steering device and the low-pressure pump.

4. The hydraulic system for a working vehicle according to claim 3, wherein
   the scavenging pump is arranged to return the oil stored in the transmission case to the steering device via a scavenging circuit that connects to the steering lubricating circuit at a second connection point between the steering device and the first point.

5. The hydraulic system for a working vehicle according to claim 4, wherein
   a restrictor is provided in the steering lubricating circuit between the first connection point and the second connection point.

6. The hydraulic system for a working vehicle according to claim 5, wherein
   a torque converter is provided in the transmission lubricating circuit between the relief valve and the transmission device; and
   the transmission-lubricating assist circuit connects to the transmission lubricating circuit at a third connection point between the torque converter and the transmission device.

* * * * *